(12) United States Patent
Miller

(10) Patent No.: US 11,125,936 B2
(45) Date of Patent: Sep. 21, 2021

(54) THERMAL INSULATOR FOR FIBER OPTIC COMPONENTS

(71) Applicant: The Government of the United States of America, as represented by the Secretary of the Navy, Arlington, VA (US)

(72) Inventor: Gary A. Miller, Alexandria, VA (US)

( * ) Notice: Subject to any disclaimer, the term of this patent is extended or adjusted under 35 U.S.C. 154(b) by 10 days.

(21) Appl. No.: 16/285,329

(22) Filed: Feb. 26, 2019

(65) Prior Publication Data

US 2020/0271854 A1 Aug. 27, 2020

(51) Int. Cl.
   G02B 6/02 (2006.01)
   G02B 6/42 (2006.01)
   G02B 6/293 (2006.01)

(52) U.S. Cl.
   CPC ......... *G02B 6/0218* (2013.01); *G02B 6/0219* (2013.01); *G02B 6/29317* (2013.01); *G02B 6/29398* (2013.01); *G02B 6/4236* (2013.01)

(58) Field of Classification Search
   CPC .. G02B 6/0218; G02B 6/4236; G02B 6/0219; G02B 6/29317; G02B 6/29398
   See application file for complete search history.

(56) References Cited

U.S. PATENT DOCUMENTS

| | | |
|---|---|---|
| 872,795 A | 12/1907 | Burger |
| 1,140,633 A | 5/1915 | Trucano |
| 4,067,315 A | 1/1978 | Fehlner et al. |
| 4,304,462 A | 12/1981 | Baba et al. |
| 4,936,646 A | 6/1990 | Enochs et al. |
| 4,984,860 A * | 1/1991 | Seike ............... G02B 6/442 174/139 |
| 5,042,898 A | 8/1991 | Morey et al. |
| 5,138,692 A * | 8/1992 | Ikeda ............... G02B 6/4417 174/139 |
| 5,493,626 A * | 2/1996 | Schultz ............... E21B 17/023 385/101 |
| 5,694,503 A | 12/1997 | Fleming et al. |
| 5,841,920 A | 11/1998 | Lemaire et al. |
| 5,914,972 A * | 6/1999 | Siala ............... G02B 6/0218 372/33 |
| 6,044,189 A | 4/2000 | Miller |
| 6,067,392 A | 5/2000 | Wakami et al. |
| 6,087,280 A | 7/2000 | Beall et al. |
| 6,101,301 A | 8/2000 | Engelberth et al. |

(Continued)

OTHER PUBLICATIONS

Lo et al., Packaging a Fiber Bragg Grating Without Preloading in a Simple Athermal Bimaterial Device, IEEE Transactions on Advanced Packaging, Feb. 2002, pp. 50-53, vol. 25, No. 1, IEEE, Piscataway, NJ, USA.

(Continued)

*Primary Examiner* — Ryan A Lepisto
*Assistant Examiner* — Erin D Chiem

(57) ABSTRACT

An embodiment of the indention includes a passive, fiber optic, thermal insulator. The thermal insulator includes an inner sleeve defining a central access port. The thermal insulator includes an outer sleeve concentric to the inner sleeve. The inner sleeve and the outer sleeve are joined sufficient to define an annular void. The thermal insulator includes a first insulator located in the annular void. Optionally, the apparatus includes at least one optical fiber secured in the central access port.

13 Claims, 4 Drawing Sheets

(56) References Cited

U.S. PATENT DOCUMENTS

| | | | |
|---|---|---|---|
| 6,112,553 | A | 9/2000 | Poignant et al. |
| 6,147,341 | A * | 11/2000 | Lemaire ............... G02B 6/0218 250/227.17 |
| 6,317,541 | B1 | 10/2001 | Davidson |
| 6,453,092 | B1 * | 9/2002 | Trentelman .......... G02B 6/0218 385/37 |
| 6,466,716 | B1 | 10/2002 | Ogle |
| 6,584,248 | B2 * | 6/2003 | Franzen ............... G02B 6/0218 385/136 |
| 6,788,873 | B2 * | 9/2004 | Fritz .................... G02B 6/4248 385/138 |
| 6,907,164 | B2 | 6/2005 | Lachance et al. |
| 7,747,126 | B2 * | 6/2010 | Dunphy ................ G01D 5/268 385/12 |
| 2003/0068150 | A1 * | 4/2003 | Ariel ................... G02B 6/2552 385/125 |
| 2007/0194683 | A1 * | 8/2007 | Serita ................... H01J 65/046 313/242 |
| 2016/0108718 | A1 * | 4/2016 | Hato ................ G01R 33/0354 324/345 |
| 2017/0027458 | A1 * | 2/2017 | Glover ............... A61B 5/02158 |

OTHER PUBLICATIONS

Lin, Samuel I-En, Turnable Athermal Multi-FBG Package Using a Bending Bimetal Structure, Transactions of the ASME, Mar. 2002, pp. 54-59, vol. 124, ASME, New York City, NY, USA.

HUANG et al., Temperature Compensation Package for Fiber Bragg Gratings, Microwave and Optical Technology Letters, Oct. 5, 2003, pp. 70-72, vol. 39, No. 1, Wiley-Blackwell, Hoboken, NJ, USA.

Iwashima et al., Temperature Compensation Technique for Fibre Bragg Gratings Using Liquid Crystalline Polymer Tubes, Electronic Letters, Feb. 27, 1997, pp. 417-419, vol. 33, No. 5, IET, London, UK.

Weidman et al., A Novel Negative Expansion Substrate Material For Athermalizing Fiber Bragg Gratings, $22^{nd}$ European Conference on Optical Communications—ECOC '96 Oslo, 1996, pp. 1.61-1.64, MoB 3.5, Oslo, Norway.

Lo et al., Packaging a Fiber Bragg Grating With Metal Coating for an Athermal Design, Journal of Lightwave Technology, May 2003, pp. 1377-1383, vol. 21, No. 5, Optical Society of America and IEEE, Washington, DC, USA.

Yoffe et al., Passive Temperature-Compensating Package for Optical Fiber Gratings, Applied Optics, pp. 6859-6861, vol. 34, No. 30, Optical Society of America, Washington, DC, USA.

* cited by examiner

THERMAL INSULATOR FOR FIBER OPTIC COMPONENTS

FIELD OF THE INVENTION

The present invention relates in general to an insulating article of manufacture for at least one in-fiber structure in one or more optical fibers, and relates more particularly to a passive thermal insulator for at least one in-fiber structure in one or more optical fibers.

BACKGROUND OF THE INVENTION

Many fiber optic components such as in-fiber gratings are highly susceptible to temperature variations while in operation. The properties of these components can change dramatically with temperature potentially causing signal fading or dropout, an increase in noise, or intensity variations in a system that responds to these properties. Owning to their small size, unpack aged fiber optic components have thermal time constants on the order of 10's of milliseconds. For the purpose of this potent application, the thermal time constant is defined us the time it takes for the in-fiber component to reach 63.2% (i.e., 1-l/e) of a step change in temperature and is dependent on the heat transfer between the outside environment and the fiber core. Components subjected to thermal fluctuations slower than this time constant will respond to these fluctuations, potentially affecting their performance. This is not only detrimental for low frequency or DC measurements but also undesirable for high frequency measurements where signal fading might be an issue. Example scenarios where this might cause deleterious effects are when the component is used for reference signals, optical filtering, channel filters or blocks, and wavelength locking. Temperature fluctuations can also be problematic for fiber lasers that rely on in-fiber gratings and splice joints between dissimilar materials or structures (such as coupling between solid core fibers and microstructured fibers).

As such, there is a need to thermally isolate or compensate fiber optic components. Manufacturers typically package these components so as to minimize this impact, employing bulky insulated enclosures, jacketing the fiber with insulating and or reflecting layers, or utilizing complicated techniques and expensive materials. These conventional techniques often employ negative coefficient of thermal expansion ("CTE") materials or bimetals to athermalize the component. The materials used in the athermalization process are often exotic, such as β-cucryptite or extruded liquid crystal polymers. Another conventional technique involves intensive handling, whereby plies of carbon fiber strands are woven into a contrahelical or braided pattern. Other conventional approaches use bimetallic structures that must be perfectly matched to the host material to negate the CTE of the optical fiber. While effective at suppressing temperature fluctuations, these conventional approaches are not easily realized by the average end user. Furthermore, these compensation materials are often only available on pre-packaged components not accessible for aftermarket or in-house fabricated optical devices.

BRIEF SUMMARY OF THE INVENTION

An embodiment of the invention includes a passive, fiber optic, thermal insulator. The thermal insulator includes an inner sleeve defining a central access port. The thermal insulator includes an outer sleeve concentric to the inner sleeve. The inner sleeve and the outer sleeve are joined sufficient to define an annular void. The thermal insulator includes a first insulator located in the annular void.

An embodiment of the invention includes a compact means for passively suppressing the effect temperature fluctuations have on in-line fiber optic components. The embodiment of the invention limits the influence of temperature changes or fluctuations in an operating environment on such in-line fiber optic components.

Utilization of a passive insulator according to an embodiment of the invention in place of conventional athermalization or insulation techniques has several advantages. For many applications, a fiber optic device need only operate within a narrow temperature range; temperature compensation over a wide range is not needed, in these instances, a passive insulator according to an embodiment of the invention can minimize temperature fluctuations sufficiently when compared to conventional athermalization techniques. Embodiments of the invention include one or more insulators, such as an evacuated gap. Because an evacuated gap provides superior thermal isolation, an embodiment of the invention also greatly improves over conventional insulation solutions wherein the fiber is simply sheathed in foam or other insulating materials.

In an embodiment of the invention, the amount of thermal suppression (i.e., the temporal response) is adjusted by controlling a vacuum pulled on the interstitial space, thereby creating an evacuated gap, between tubes. Such an embodiment of the invention achieves satisfactory performance in packages even on the order of a few millimeters in diameter.

Another embodiment of the invention advantageously includes the ability to utilize an insulator of this type with aftermarket or in-house fabricated fiber optic devices. Applicant knows of no commercial product that is, for example, oversleeved on an optical fiber and provide a similar level of insulation as an embodiment of the invention.

Another embodiment of the invention finds application in fiber optic sensing and communication systems employing optic components in u nominally stable thermal operating environment. One of ordinary skill in the art will readily appreciate that the expression nominally stable thermal operating environment includes under standard normal, uncontrolled environments, and not an idealized or theoretical environment. Examples of such optic components include fiber Bragg gratings. Such fiber optic sensing and communication systems are used for reference signals, optical filtering, channel filters or blocks, and wavelength locking.

Another embodiment of the invention finds application in fiber lasers employed in a nominally stable thermal operating environment, wherein such fiber lasers rely on in-fiber gratings.

Another embodiment of the invention finds application in splice joints between dissimilar materials or structures.

Another embodiment of the invention permits use of fiber optic sensing and communication systems and fiber laser systems in a wider range of operating temperatures than is presently possible. The range of operating temperatures for such a system is indicated by its thermal time constant. A maximum thermal time constant for an optical fiber in an embodiment of the invention including an ideal evacuated thermal insulator is about 200 seconds, a maximum thermal time constant for on optical fiber in an embodiment of the invention including an single-walled thermal insulator is about 1.5 seconds, and a maximum thermal time constant for an optical fiber in an embodiment of the invention including a double-walled thermal insulator is about 5 seconds. By contrast, a maximum thermal time constant for bare fiber (i.e., an optical fiber having no thermal insulation or coating) is about 40 milliseconds. In terms of temperature fluctuations typically found under operating conditions, an optical fiber with a fiber Bragg grating (FBG) in an embodiment of the invention including a double-walled insulator exhibits a wavelength shift error of around 15 pm, and an optical fiber in an embodiment of the invention including an ideal evacuated thermal insulator exhibits a wavelength shill error of around 1 pm. By contrast, bare fiber without any thermal insulation exhibits a wavelength shill error of 40 pm. In other words, an optical fiber in an embodiment of the invention including an ideal evacuated thermal insulator exhibits over a 30 dB (power spectral density) improvement over bare fiber without any thermal insulation.

DETAILED DESCRIPTION OF THE INVENTION

Figure 1:
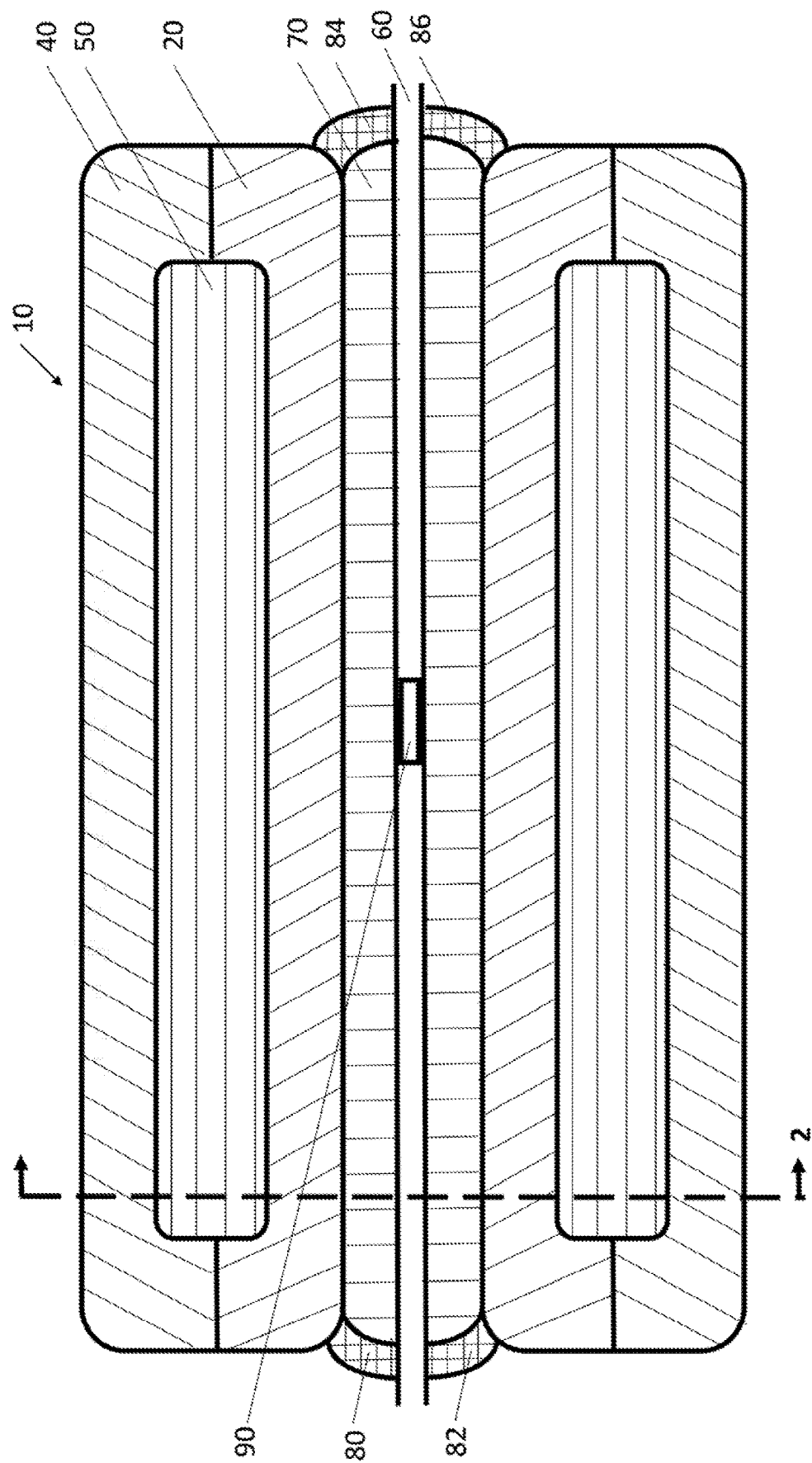
FIG. 1 is a longitudinal cross-sectional view of an embodiment of the invention disposed around an optical fiber.

An embodiment of the invention includes a passive, fiber optic, thermal insulator 10, and is described us follows with reference by way of non-limiting illustration to FIGS. 1-4. The thermal insulator 10 includes an inner sleeve 20 defining a central access port 30, as shown by way of illustration in FIGS. 1 and 2. The central access port runs longitudinally through the inner sleeve 20 along the axis of the inner sleeve. The thermal insulator 10 includes an outer sleeve 40 concentric to the inner sleeve. The inner sleeve and the outer sleeve are joined sufficient to define an annular void. The thermal insulator 10 includes a first insulator 50 located in the annular void.

Figure 2:
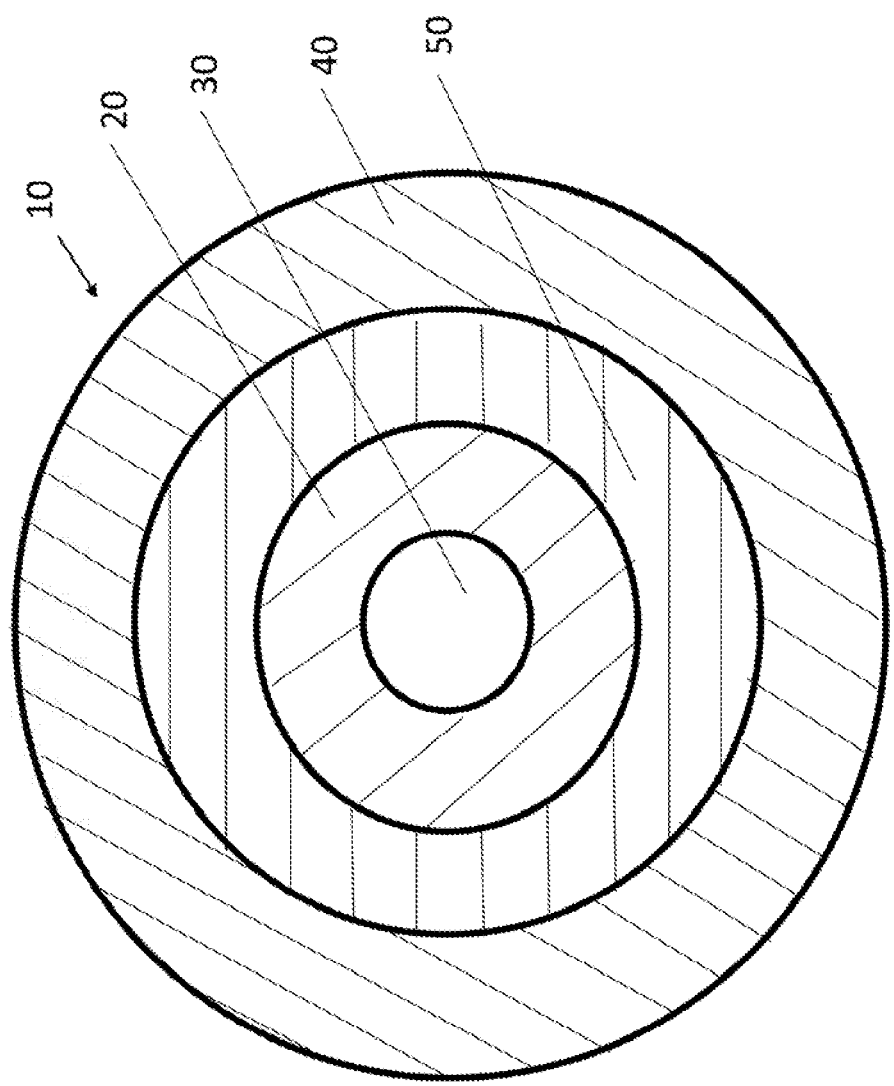
FIG. 2 is a transverse cross-sectional view of an embodiment of the invention.
Figure 3:
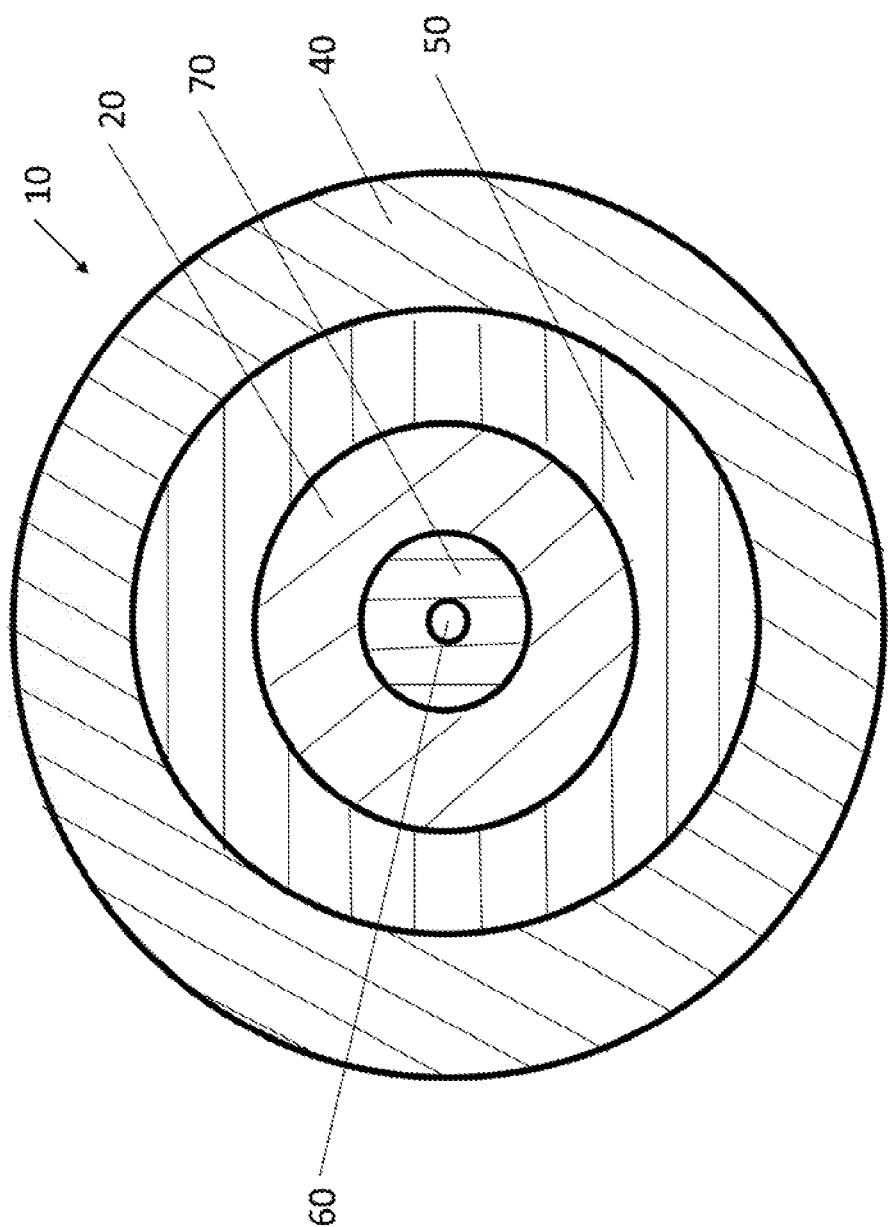
FIG. 3 is a transverse cross-sectional view of an embodiment of the invention disposed around an optical fiber.
Figure 4:
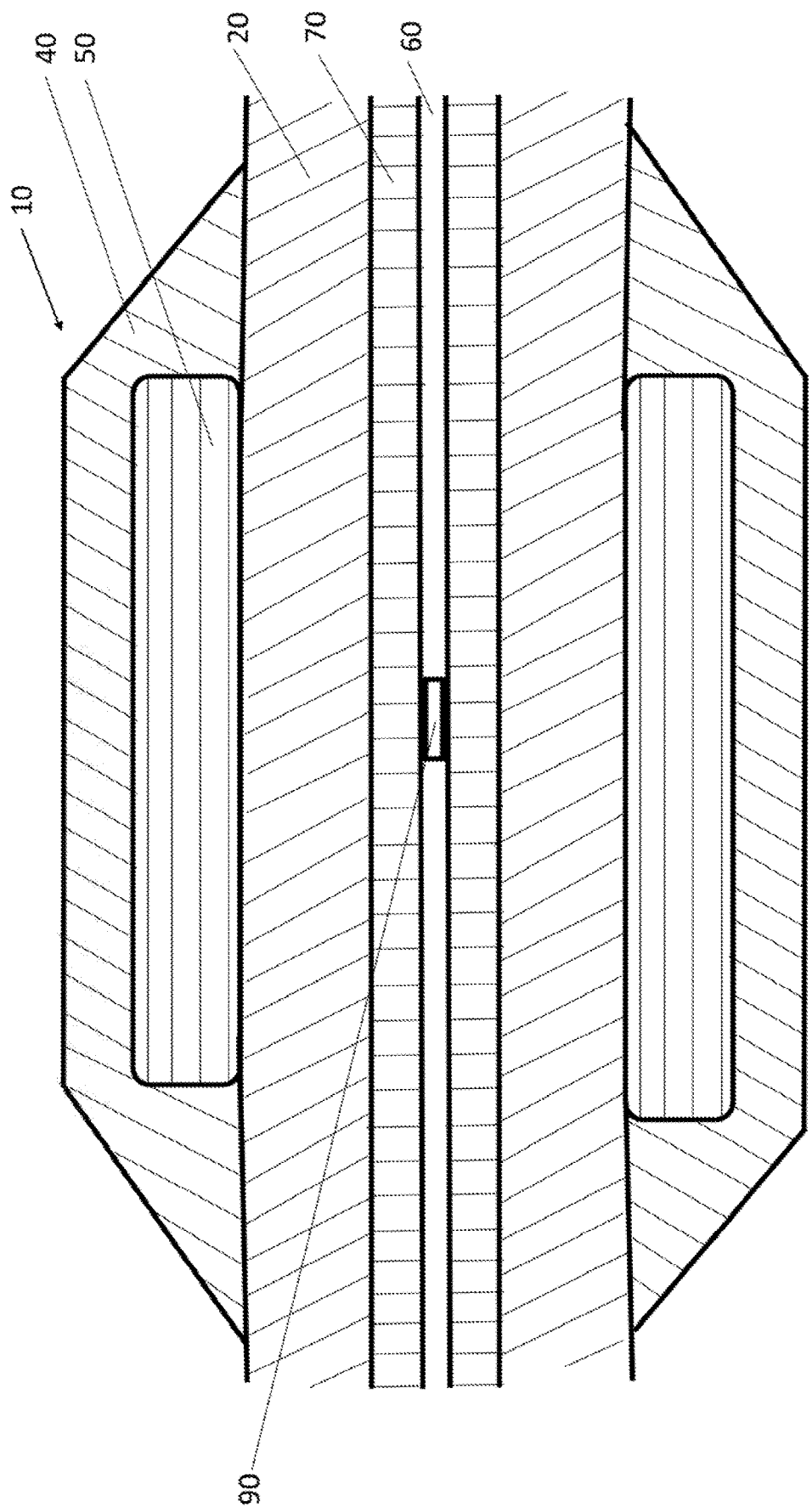
FIG. 4 is a longitudinal cross-sectional view of another embodiment of the invention disposed around an optical fiber.

Optionally, the inner sleeve 20 includes a circular inner sleeve cross-section, as shown by way of illustration in FIG. 2. The outer sleeve 40 includes a circular outer sleeve cross-section, as shown by way of illustration in FIG. 2. Other embodiments of the invention include cross-sections with standard or irregular shapes, depending on application and/or case of manufacturing.

Optionally, the outer sleeve 40 includes outer sleeve ends. The outer sleeve ends tapering toward the inner sleeve 20, as shown by way of illustration in FIG. 4.

Optionally, the inner sleeve 20 includes a standard inner sleeve material, and the outer sleeve 40 includes a standard outer sleeve material. The inner sleeve material and the outer sleeve material include a same material or a different material. Optionally, the outer sleeve material includes a standard doped silica glass, and the inner sleeve material comprising a standard pure silica glass. One or more standard dopants for the doped silica glass lower the outer sleeve melting point relative to the inner sleeve material melting point of the pure silica glass. For example, the outer sleeve material includes standard borosilicate glass, and the inner sleeve material includes standard fused silica. For example, the outer sleeve material includes standard soda-lime glass, standard lead glass, standard aluminosilicate glass, standard 96% silica glass, and/or fused silica gloss. Optionally, the outer sleeve material includes an outer sleeve material melting temperature, and the inner sleeve material included an inner sleeve material melting temperature, which is greater than the outer sleeve material melting temperature.

Optionally, surfaces of the inner sleeve and/or the outer sleeve are optionally coated with a standard reflective coating or a standard reflective foil to reduce radiative heating by lowering the emissivity of the tubes. For example, the outside surface of the inner sleeve and/or the inside surface of the outer sleeve includes the reflective coating. For example, materials for such reflective coatings or foils include silver, aluminum, gold, and or copper.

Optionally, the first insulator 50 includes air, vacuum, an aerogel, a xerogel, a freeze-dried sol-gel, a hydrogel, a foam, fiberglass, cellulose, and/or a plurality of gloss beads. Optionally the second insulator 70 includes air, a vacuum, an aerogel, a xerogel, a freeze-dried sol-gel, a hydrogel, a foam, fiberglass, cellulose, and or a plurality of glass beads.

Optionally, the inner sleeve includes inner sleeve ends. The apparatus further includes at least one standard optical fiber 60 secured in the central access port 30, as shown by way of illustration in FIGS. 1, 3, and 4. The apparatus further includes a second insulator 70 located in the central access port 30 and between the inner sleeve 20 and the at least one optical fiber 60. For example, the cross-sectional area of the central access port depends on the cross-sectional area of the at least one optical fiber 60 and/or the thickness of the second insulator 70, both of which depend on a user's application. The apparatus further includes a plurality of end caps 80, 82, 84, 86 sealing the inner sleeve ends and/or the outer sleeve ends to the at least one optical fiber 60. Optionally, the plurality of end caps 80, 82, 84, 86 includes standard epoxy, standard thermoplastic, standard polyurethane, standard acrylic, a standard polyimide, standard silicone, standard cyanoacrylate, and/or a standard polyester resin-based material. Optionally, the at least one optical fiber 60 includes at least one standard in-fiber component 90. For example, the in-fiber component includes a standard in-fiber sensor, a standard in-fiber filter, a standard long-period fiber grating, a standard Fabry-Perot cavity, a standard resonant cavity, a standard microstructured fiber component, a standard micromachined fiber component, or a standard optical fiber coating. Examples of the in-fiber sensor includes a standard intensity-based sensor, a standard phase-based sensor, and a standard wavelength-based sensor. The in-fiber sensor optionally includes a standard fiber taper or a standard fiber splice. For example, the in-fiber filter includes a standard fiber Bragg grating. For example, the optical fiber coating includes a standard plastic coating, a standard metal coating, a standard carbon cooling, a standard polyimide coating, and or a standard organic polymer coating. Optionally, the at least one optical fiber includes a plurality of standard optical fibers, a standard multi-fiber bundle, and or a standard multicore fiber. Optionally, the at least one optical fiber includes a standard output fiber coupled to the multi-fiber bundle.

Another embodiment of the invention is described as follows with reference to FIGS. 1-4. This embodiment of the invention minimizes thermal fluctuations from affecting an in-fiber optic component 90, such as a standard grating, through passive temperature control via insulation. To insulate the grating from the environment, a thermal insulator 10 according to an embodiment of the invention, for example, utilizes an evacuated air gap between inner sleeve 20 and outer sleeve 40, which are for example embodied as welded glass capillaries, configured in a concentric configuration.

For example, the thermal insulator 10 uses a double wall, inner sleeve and outer sleeve, structure reminiscent of those found in cryogenic liquid storage vessels, vacuum insulated pipes, or solar heat pipes. In an embodiment of the invention, the ends of the inner sleeve 20 and outer sleeve 40 are sealed together leaving a central access pent through the interior of the inner cylinder for fiber optic components. Once the fiber optic device 60 is led through the thermal insulator 10, the evacuated gap eliminates the dominant radial conduction path to the in-fiber component 90 and reduces convection in the interstitial space. The addition of a thermal mass surrounding the optical component can also be utilized to increase the effective time constant of the fiber.

In an embodiment of the invention, two different glass materials art used for the inner sleeve 20 and the outer sleeve 40, standard fused silica and standard borosilicate glass. For example, a fused silica tube or cylinder serves as the inner sleeve 20, and a borosilicate glass tube or cylinder serves as the outer sleeve 40. The reason for this is the difference in the melting point between the two materials. Fused silica melts around 1600° C., and borosilicate softens at 800° C. Thus, the borosilicate tube is, for example, melted onto the fused silica tube, impairing no deformation to the inner tube. Optionally, careful control of the heat zone permits use of a single type of glass for the inner sleeve 20 and the outer sleeve 40, thereby minimizing thermally-induced stresses at the weld seams due to differences in CTEs between materials comprising the inner and outer sleeves.

To achieve concentricity between the inner sleeve and outer sleeve tubes, each tube is, for example, independently clamped and aligned along a common longitudinal axis. Concentricity is achieved when the inner tube is able to cleanly pass through the outer tube and has equal margins of interstitial space in the transverse directions. In another embodiment of the invention, a standard alignment jig is used to allow the ends of the tubes to be placed in such a manner that they are forced into concentricity. Another embodiment of the invention includes end caps with protruding rings 80, 82, 84, 86 on which the inner sleeves and or the outer sleeves fit. The assembled tubes are then clamped and processed. Optionally, the endcaps are an alignment fixture that are removed alter the thermal insulator has been fabricated.

The outer sleeve 40 is sealed to the inner sleeve 20 using a standard heat source. Standard heat sources that provide a uniform distribution of heat around the capillaries are preferred as they ensure an even and symmetric weld. Examples of such heat sources include standard large area isothermic plasma fields and standard filament-heating elements typically employed in fiber optic glass processing machines, multiple standard burner micro-torches, and/or standard annular heating by a standard $CO_2$ laser beam.

In another embodiment of the invention, fabricating the thermal insulator 10 vertically is advantageous. This vertical geometry allows the melted glass to flow symmetrically about the inner tube, rather than slumping to one side due to gravity.

In another embodiment of the invention, mounting the inner and outer sleeves 20, 40 horizontally in a rotating lathe produces a uniform weld. Scaling one end of the outer sleeve 40 allows a vacuum to be pulled on the structure, after which, the other end is, for example, sealed, thereby creating an evacuated region between the two tubes. The remaining glass structure is, for example, then cleaved or polished down beyond the sealed ends. To protect the thermal insulator 10, the thermal insulator is, for example, placed inside a metal or other rigid cylinder and potted with a standard encapsulant. The assembled piece is, for example, then thread onto the fiber optic component 90 and potted using a standard adhesive. A standard v-groove assembly block is, for example, utilized to ensure coaxially placement of the fiber within the insulator. The in-fiber component 90 has minimal tension to prevent temperature-induced elongation of the insulator from straining the fiber. Optical elements that require tuning should be pre-strained prior to insertion in the thermal insulator 10. Additional standard, low thermal conductivity fillers, such as standard aerogel granules or powders, could be employed within the central region to limit motion of the fiber and further insulate the component.

In another embodiment, the fiber optic component 90 is sealed within the thermal insulator 19 according to an embodiment of the invention while under vacuum. In this embodiment of the invention, a single tube or a plurality of tubes is, for example, used to increase the insulation properties as the space around the fiber component is evacuated. Alternative embodiments of the invention could also utilize materials other than glass. Standard plastics and or standard metals capable of welding (e.g., through standard heat, standard laser irradiation, or standard ultrasonic induction heating) are illustrative non-glass materials, though these often require minimal air gaps or filler material incompatible with vacuum systems. Another embodiment optionally includes insulating layers in the evacuated air space. Insulating materials, such as standard glass fiber or heads, standard cellulose or other standard fibrous material, and standard aerogel blankets, optionally provide even more temperature insulation.

Although a particular feature of the disclosure may have been illustrated and/or described with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed as new and desired to be protected by Letters Patent of the United States is:

1. An apparatus comprising:
 a passive, fiber optic, thermal insulator comprising:
  an inner sleeve defining a central access port and comprising inner sleeve ends;
  an outer sleeve concentric to said inner sleeve and comprising outer sleeve ends, said inner sleeve ends and said outer sleeve ends being directly joined sufficient to define an annular void concentrically between said inner sleeve and said outer sleeve, the annular void comprising a length between said inner sleeve ends and said outer sleeve ends; and
  a tubular first insulator located in the annular void and extending along the length.

2. The apparatus according to claim 1, wherein said inner sleeve comprises a circular inner sleeve cross-section, said outer sleeve comprising a circular outer sleeve cross-section.

3. The apparatus according to claim 1, wherein said outer sleeve comprises outer sleeve ends, said inner sleeve said outer sleeve ends tapering toward said inner sleeve.

4. The apparatus according to claim 1, wherein said inner sleeve comprises an inner sleeve material, said outer sleeve comprising an outer sleeve material,
wherein said inner sleeve material and said outer sleeve material comprise one of a same material and a different material.

5. The apparatus according to claim 4, wherein said outer sleeve material comprises an outer sleeve material melting temperature, said inner sleeve material comprising an inner sleeve material melting temperature greater than said outer sleeve material melting temperature.

6. The apparatus according to claim 5, wherein said outer sleeve material comprises a doped silica glass, said inner sleeve material comprising a pure silica glass.

7. The apparatus according to claim 1, wherein said first insulator comprises at least one of air, vacuum, an aerogel, a xerogel, a freeze-dried sol-gel, a hydrogel, a foam, fiberglass, cellulose, and a plurality of glass beads.

8. The apparatus according to claim 1, wherein said inner sleeve comprises inner sleeve ends,
wherein the apparatus further comprises:
at least one optical fiber secured in the central access port;
a second insulator located in the central access port and between said inner sleeve and said at least one optical fiber; and
a plurality of end caps sealing at least one of said inner sleeve ends and said outer sleeve ends to said at least one optical fiber.

9. The apparatus according to claim 8, wherein said at least one optical fiber comprises at least one in-fiber component, said in-fiber component comprising one of an in-fiber sensor, an in-fiber filter, a long-period fiber grating, a Fabry-Perot cavity, a resonant cavity, a microstructured fiber component, a micromachined fiber component, and a coating,
wherein said in-fiber sensor comprises one of an intensity-based sensor, a phase-based sensor, a wavelength-based sensor, a fiber taper, and a fiber splice; and
wherein said in-fiber filter comprises a fiber Bragg grating.

10. The apparatus according to claim 8, wherein said at least one optical fiber comprises at least of a plurality of optical fibers, a multi-fiber bundle, and a multicore fiber.

11. The apparatus according to claim 10, wherein said at least one optical fiber comprises an output fiber coupled to said multi-fiber bundle.

12. The apparatus according to claim 8, wherein said second insulator comprises at least one of at least one of air, a vacuum, an aerogel, a xerogel, a freeze-dried sol-gel, hydrogel a foam, fiberglass, cellulose, and a plurality of glass beads.

13. The apparatus according to claim 8, wherein said plurality of end caps comprises at least one of epoxy, thermoplastic, polyurethane, acrylic, a polyimide, silicone, cyanoacrylate, and a polyester resin-based material.

* * * * *